United States Patent [19]

Day

[11] 4,373,504

[45] Feb. 15, 1983

[54] GAS BURNER CONVECTION OVEN

[75] Inventor: William J. Day, Allentown, Pa.

[73] Assignee: Raytheon Company, Lexington, Mass.

[21] Appl. No.: 219,413

[22] Filed: Dec. 22, 1980

Related U.S. Application Data

[63] Continuation of Ser. No. 4,007, Jan. 16, 1979, abandoned.

[51] Int. Cl.[3] .......................... F24C 15/32; A21B 1/00

[52] U.S. Cl. ............................... 126/21 A; 126/39 E; 126/273 R

[58] Field of Search ................ 126/21 R, 21 A, 19 R, 126/273 R, 39 E; 219/400, 408, 393

[56] References Cited

U.S. PATENT DOCUMENTS 3,561,896 2/1971 Riehl ................................ 126/39 E 3,626,922 12/1971 Borge .............................. 126/21 A 3,884,213 5/1975 Smith ................................ 126/19 R 3,905,760 9/1975 Johansson et al. ............... 126/21 A 4,071,739 1/1978 Jenn et al. ........................ 126/21 A

*Primary Examiner*—Daniel J. O'Connor

*Attorney, Agent, or Firm*—William R. Clark; Milton D. Bartlett; Joseph D. Pannone

[57] ABSTRACT

A convection oven in which vapor is circulated through the oven by a pair of counter rotating blowers positioned in the rear of the oven which draw vapor from the oven along with combustion products from a multi-section ribbon burner which has a secondary air passage between the sections and which is positioned below the oven rear wall vapor outlet region and blow the combined vapor and combustion products into the oven adjacent the top surface. The blowers generate slight negative pressure in the combustion plenum by blowing a small portion of the output of the blowers out an output vent to control the amounts of primary and secondary air supplied to the burner system.

2 Claims, 6 Drawing Figures

GAS BURNER CONVECTION OVEN

This is a continuation of application Ser. No. 4,007 filed Jan. 16, 1979, now abandoned.

CROSS-REFERENCE TO RELATED APPLICATIONS

Copending U.S. patent application Ser. No. 4,008, filed Jan. 16, 1979 and assigned to the same assignee as the present invention, is hereby incorporated by reference and made a part of this disclosure.

BACKGROUND OF THE INVENTION

Burner systems for domestic convection ovens have provided large combustion and/or mixing plenums due to the large burner flame lengths. Also large amounts of excess air, are used at normal baking temperatures since, when the oven is run at its maximum temperatures such as for self-cleaning, the mass of air circulated is reduced. It has been usual to vent the oven directly and to use relatively high pressure blower systems to maintain sufficient flow of excess air through the burner system at self cleaning temperatures so that undesirable generation of noxious fumes such as carbon monoxide does not occur.

In addition, it has been difficult to adequately monitor actual flow of air into the burner system so that if the blower fails the burner will reliably shut down.

SUMMARY OF THE INVENTION

In accordance with this invention there is provided a convection oven having a burner and oven circulation blower system in which the amount of the primary air-fuel mixture being drawn into the combustion plenum through an elongated burner system is controlled by a convection vapor circulation system. More specifically, the burner comprises a multi-section ribbon burner with the two sections being spaced apart by a secondary air supply region. The height of flame above the burner surface may be less than the total width of the burner system being, for example, on the order of an inch high, and the excess air may be in the range of 65% to 150% of that required for complete combustion.

Preferably, the ribbon burner surface is positioned at a level below the oven floor and behind the rear oven wall containing the oven outlet through which vapor is drawn by the oven vapor circulation system. By using two counter-rotating blowers, positioned behind the rear oven wall, for the vapor circulators, power to drive the blower may be a low value such as 50 watts.

This invention provides a convection oven in which a gas burner is positioned adjacent the input of a circulating blower system for drawing vapor products out of the oven and recirculating said products mixed with the combustion products of the burner back through the oven. The burner comprises a plurality of elongated ported sections for supplying a primary fuel-air mixture to a combustion plenum separated by regions through which secondary air is supplied to the combustion plenum. More specifically, the burner comprises a plurality of metal ribbons which are transversely corregated along their length so that the corrugations act as ports. Preferably, the ribbons have a width extending from a plenum supplied with the primary fuel-air mixture to the burner plenum with the ribbon width being sufficient to prevent flashback into the supply plenum even when relatively high primary fuel-air mixtures such as 50-80% are used. In addition, by having each of the ribbons separated from a source of secondary air by a distance which is less than twice the transverse dimension of the port and by using on the order of 50% to 150% excess air, the height of the flame may be reduced to a dimension which is substantially the same as or less than the transverse distance across the burner face between adjacent sources of secondary air.

Further in accordance with this invention the burner may be run at high power continuously by using the negative pressure created by the inlet of a blower to draw the primary fuel-air mixture through the burner at a rate which lifts the burner flame front from the surfaces of the ports formed by the ribbons so that heating of the burner port region is reduced thereby reducing probability of flashback through the burner ports.

This invention further provides that by using a blower system which draws the combustion products out of the combustion plenum, the input to the air-fuel primary mixture plenum of the burner may be fed from a gas regulator through an orifice. Variations in blower speed or atmospheric pressure will then cause corresponding variations in the flow of gaseous fuel from the regulator so that greater uniformity of the fuel-air mixture may be maintained and hence the excess air may be reduced from the normal 300% or so found in domestic gas appliances to less than 100% while still preserving a sufficient safety margin of excess air.

Further in accordance with this invention there is provided a control system for a convection oven in which a circulating blower system actuates a switch in response to movement of the air or oven vapor which controls the burner so that if the blower system fails, for example, due to motor burn out or the impeller becoming loose on the shaft, the burner is disabled thereby providing a fail-safe condition of operation.

In accordance with this invention it has been found that by using a burner in which the excess air is substantially reduced, the output temperature of the burner may be raised to temperatures on the order of 1800° F. while still maintaining sufficient oxygen in the combustion products from the burner to readily pyrolize cooking vapors or vapor deposits on the oven.

BRIEF DESCRIPTION OF THE DRAWINGS

Other and further embodiments of the invention will become apparent as the description thereof progresses, reference being had to the accompanying drawings wherein.

DESCRIPTION OF THE PREFERRED EMBODIMENT

Figure 1:
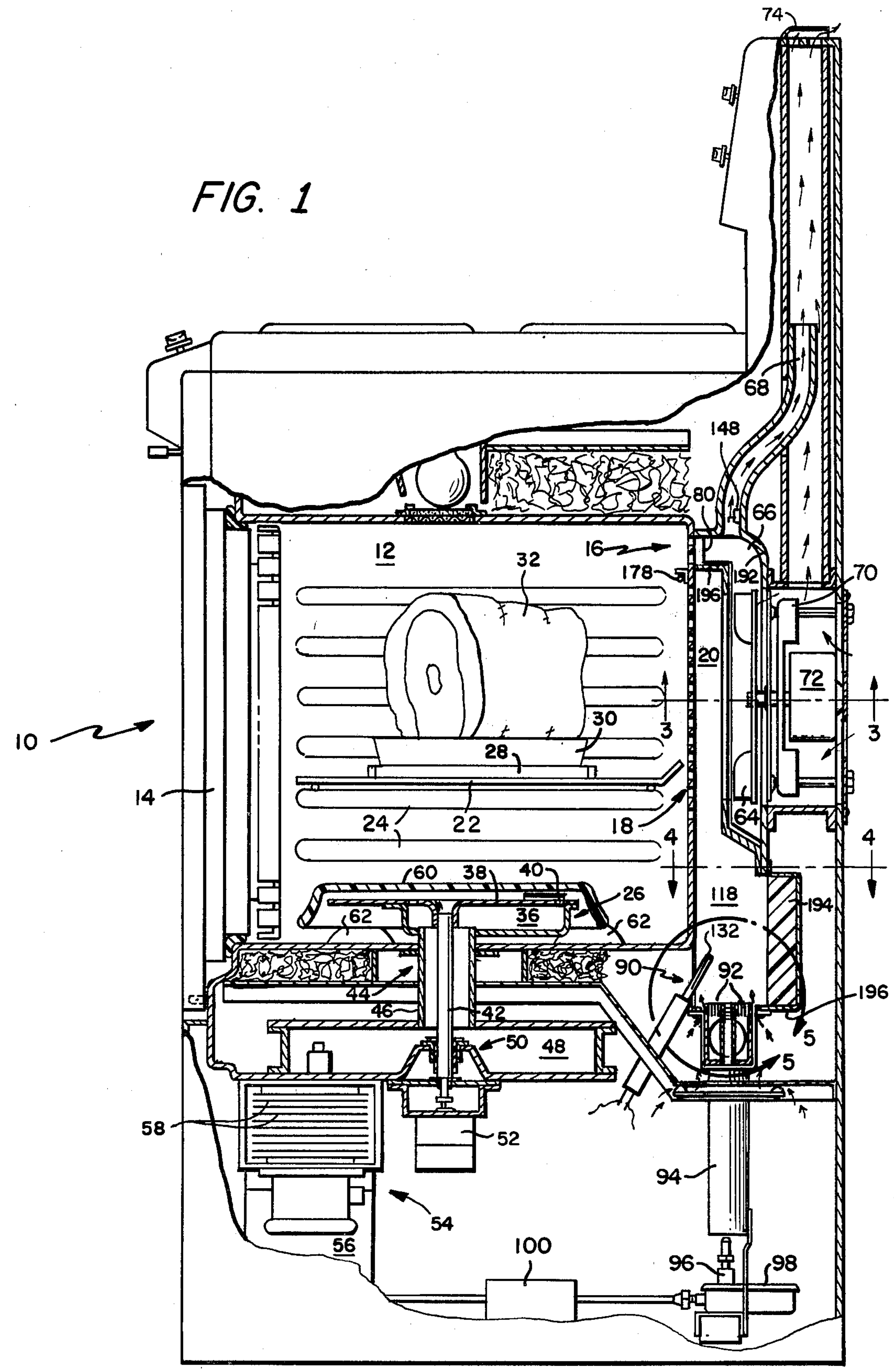
FIG. 1 illustrates a partially broken away side elevation view of an oven embodying the invention.

Referring now to FIGS. 1–6 there is shown a gas convection stove 10 embodying the invention. Stove 10 comprises an oven cavity 12 of metal such as porcelainized steel which is closed by a door 14 during operation.

A rack 22 made, for example, of steel rods is supported on bumps 24 formed in the side walls of the enclosure 12 so that the position of the rack 22 may be changed in accordance with well-known oven practice.

The upper portions of the back wall of cavity 12 has an elongated vapor inlet region 16 and the middle of the back wall has a pair of vapor outlet regions 18. Vapor is drawn out of the enclosure 12 through regions 18 into a plenum 20.

A microwave radiator 26 is positioned below rack 22 and directs microwave energy up through the apertures in rack 22, through a support plate 28, positioned in the middle of rack 22, and through a dish 30 containing a food body 32 such as a roast of meat. Dish 30, as well as plate 28, are preferably substantially transparent to microwave energy so that the lower region of food body 32 and the interior portions thereof may be heated effectively by microwave energy.

Radiator 26 may comprise, for example, a plenum 36 whose upper surface 38 contains a plurality of apertures 40 through which directive microwave energy patterns are radiated upwardly into oven 12. A central conductor 42 of a coaxial line 44 supports plenum 36 by being attached to the center of upper plate 38. Conductor 42 extends downwardly through the outer conductor 46 of coaxial line 44 and through a waveguide 48 to a microwave choke and bearing assembly 50. An extension of conductor 42 is rotated by a motor 52 below waveguide 48. Microwave energy from a magnetron 54 is fed through waveguide 48 and coaxial line 44 to radiator 26. A blower 56 blows air past the fins 58 of magnetron 54 to cool the magnetron, but none of this air passes through waveguide 48. A cover 60 of microwave transparent material is supported over radiator 26 on centering bumps 62 on the bottom of oven 12 to cover radiator 26 and thereby prevent food juices or other material from being dropped on radiator 26.

Door 14 is preferably sealed to enclosure 12 by a high temperature vapor seal with a microwave choke structure positioned between said vapor seal and the interior of enclosure 12 so that microwave energy radiated into oven 12 is largely prevented from being absorbed from the high temperature vapor seal. However, any microwave energy passing through said choke section is substantially absorbed by the high temperature vapor seal. When door 14 is closed, a latch is mechanically moved to lock door 14 shut and to permit energization of the magnetron 54. Further details and advantages of such a microwave oven feed and directive energy rotating structure are disclosed in greater detail in the aforesaid copending application. However, any desired microwave feed structure, radiator, and/or door seal could be used. It should be clearly understood that this invention may be used without the foregoing microwave energy system.

In accordance with this invention a slight negative pressure, such as 0.01 to 0.1 inches of water, is produced within plenum 20 by a blower system comprising two counter-rotating centrifugal blowers 64 which draw vapor out of cavity 12 through regions 18 into plenum 20 and blows it out into plenums 66 surrounding blowers 64 and supplying region 16. The upper ends of plenum 66 are connected to an opening through which a small portion of the output of blowers 64 pass through an outlet vent 68 where the air is mixed with air blown by a second set of blowers 70. Blowers 70 draw cool air in from the back of the stove 10 to cool motors 72 driving blowers 64 and 70 and to supply air to mix with the output of duct 68 which then exits through a screened aperture 74 at the top of the stove 10 above the cooking surface.

Figure 2:
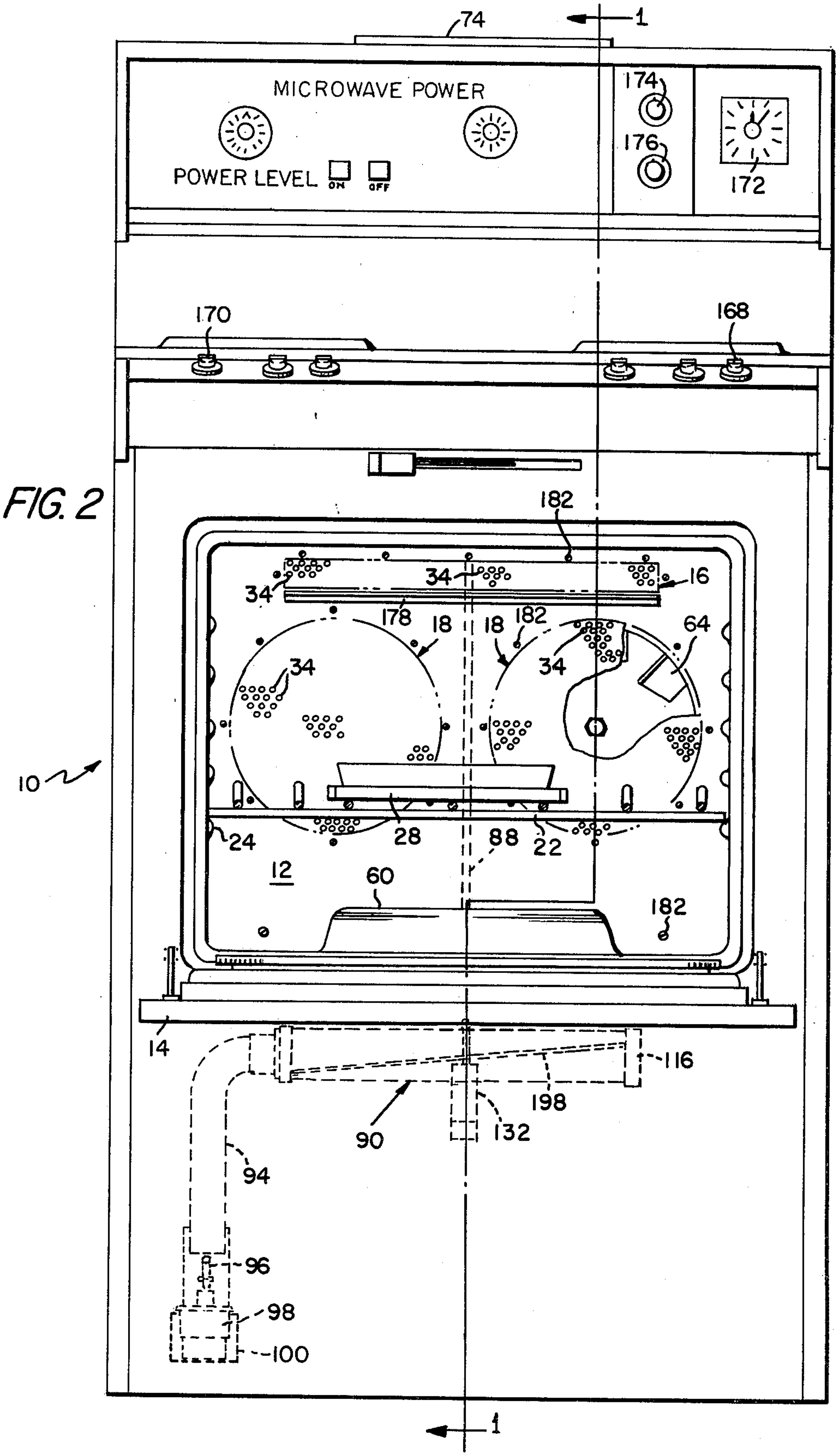
FIG. 2 illustrates a vertical partial sectional view of the oven of FIG. 1 taken along line 2—2 of FIG. 1.
Figure 3:
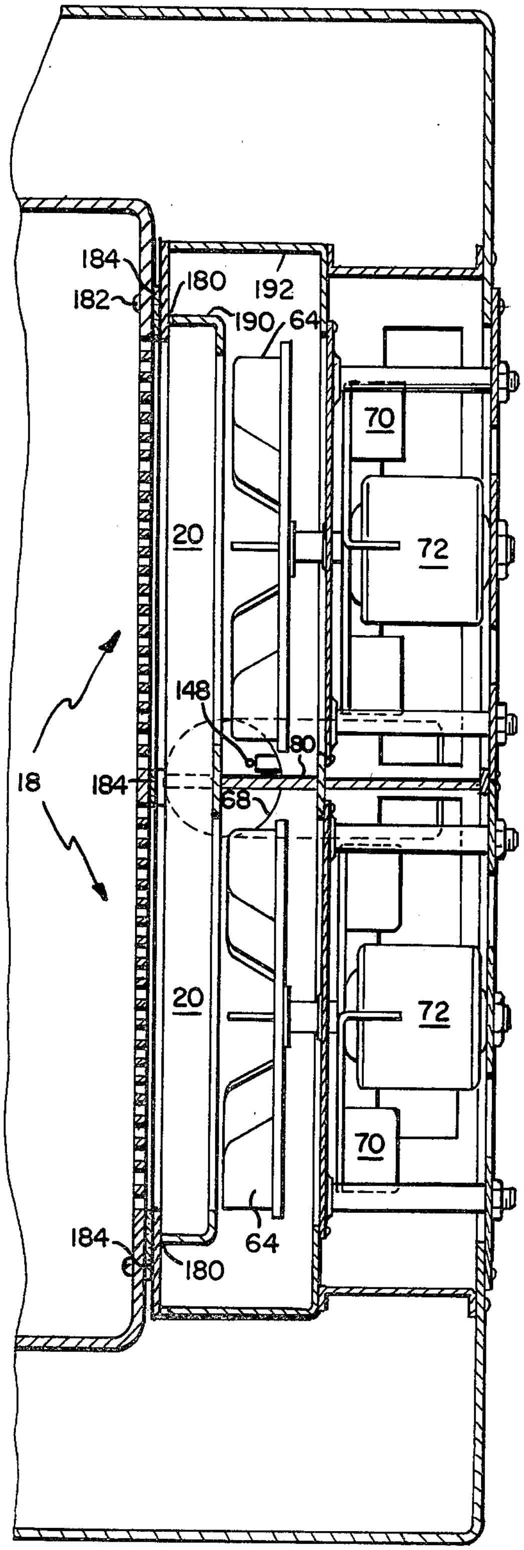
FIG. 3 illustrates a transverse sectional view of the oven of FIG. 1 taken along line 3—3 of FIG. 1.
Figure 4:
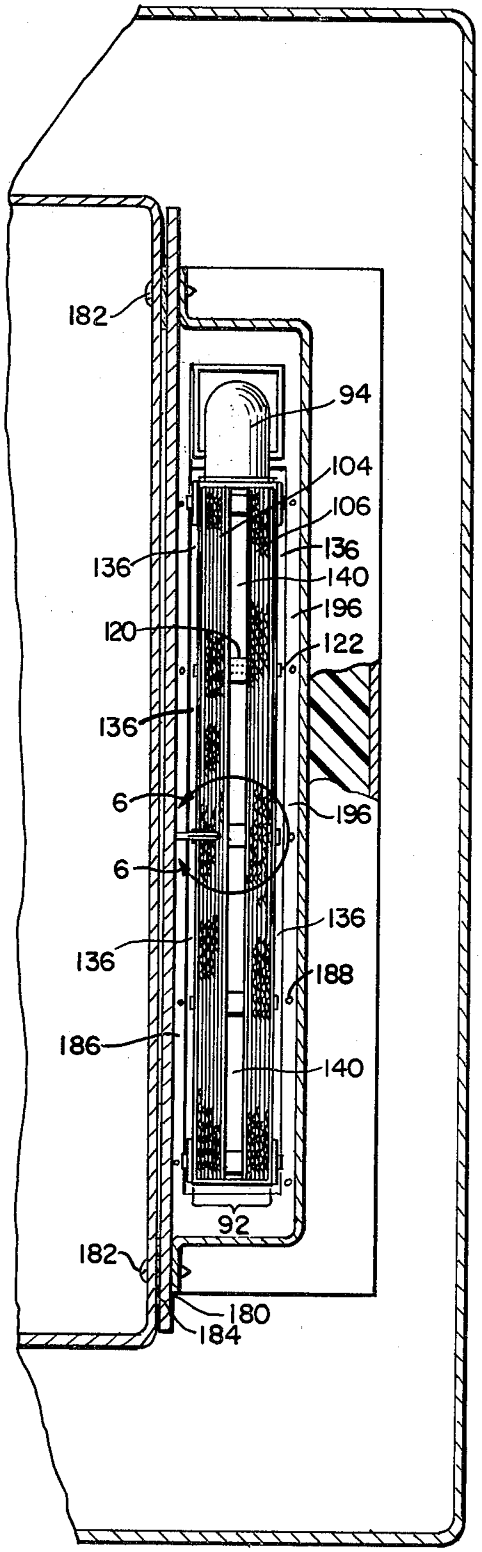
FIG. 4 illustrates a transverse sectional view of the oven of FIG. 1 taken along line 4—4 of FIG. 1.

As shown in FIGS. 2 and 3, each of the apertured regions 18 supplies vapors from the oven to a separate blower 64, and each blower 64 is driven along with one of the blowers 70, by a common shaft of a separate motor 72 which is supported from a back wall 78 of the stove 10. The heat from blowers 64 is thus isolated from motors 72. A partition 80 between the two blowers 64 prevents tangential interaction of the vapor output of the blowers 64, which rotate in opposite directions to cause the air between the blowers to move upwardly adjacent partition 80. It should be clearly understood that a single blower could be used in place of the dual blowers 64 and the plenum 66 could have separate ducting systems to direct the vapor through a plurality of different regions 16 into the oven. However, it has been found that the dual counter rotating blower system can improve the uniformity of convection heating in the oven and reduce the blower power.

A burner system 90 is positioned at the rear of stove 10 behind and below enclosure 12. Burner system 90 comprises a ribbon burner 92 extending across a major portion of the width of the oven and fed at one end with a primary fuel-air mixture through vertical tubular member 94. The open lower end of member 94 is supplied with gas through a gas jet 96 from a solenoid operated valve 98 fed from a pressure regulator 100 through a gas line 102.

Figure 5:
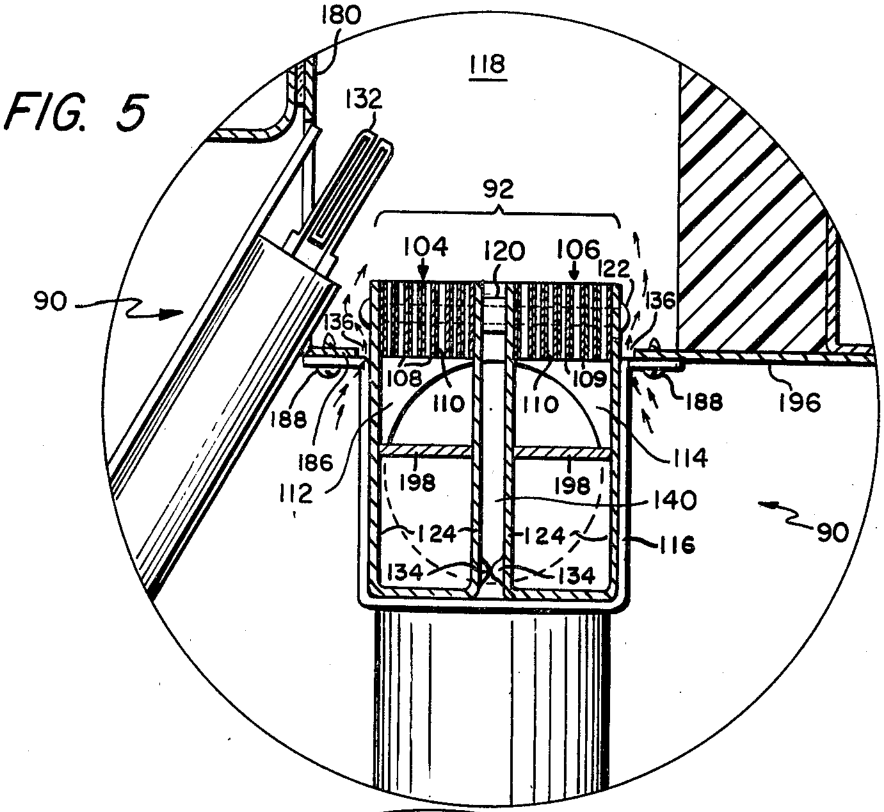
FIG. 5 is an expanded view of the burner portion of FIG. 1 taken along line 5—5 of FIG. 1.
Figure 6:
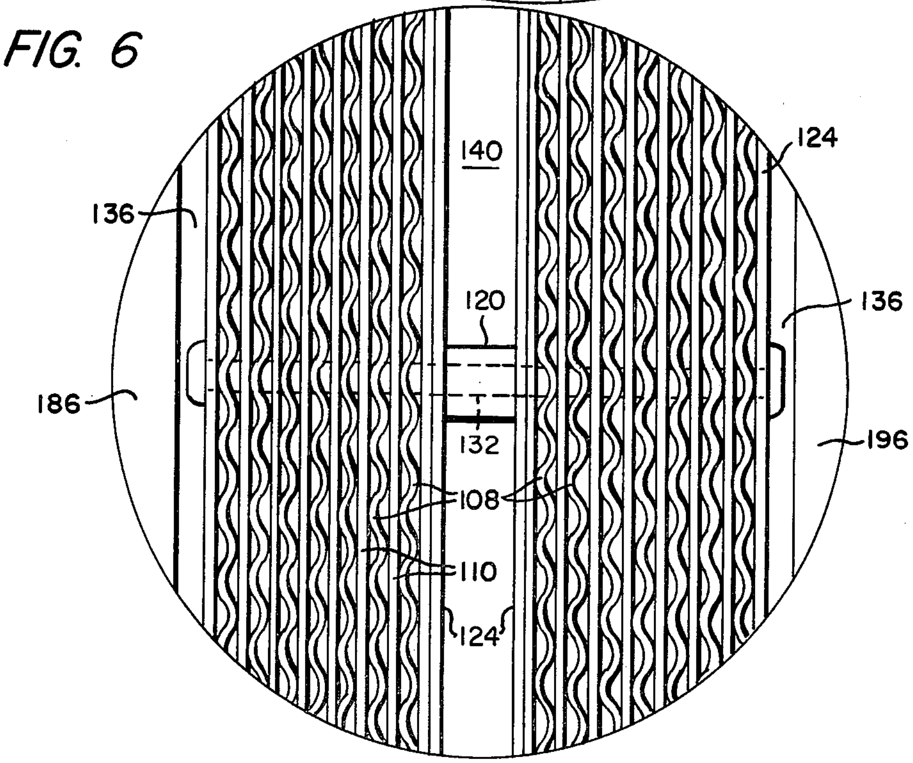
FIG. 6 is an expanded view of a burner of FIG. 4 taken along line 6—6 of FIG. 4.

As shown in FIGS. 5 and 6, the ribbon burner 92 comprises two sections 104 and 106 each formed of seven ribbons of sheet metal 108 approximately one-half inch wide and forty thousandths of an inch thick extending the length of the burner, said members 108 being corrugated for example, by a die. The corrugations run across the width of the members and are, for example, three sixteenths of an inch from peak to peak. Interspersed between members 108 are flat members 110 of the same width and extending the lengths of the burner so that the spaces between the corrugations act as ports through which a primary fuel-air mixture supplied by pipe 94 can flow. The sections 104 and 106 are supplied from separate plenums112 and 114 respectively which are both supplied at their ends from the pipe 94.

The plenums 112 and 114 are made in the shape of rectangular boxes 124 which are supported by bracket members 116 from the bottom of a combustion plenum 118 communicating with the input to the blowers 64 through plenum 20. The two sections 104 and 106 of the burner are separated by spacers 120 and the burner assembly sections 104 and 106 are held together by rivets 122 extending through the spacers 120 and through all of the ribbon members 108 and 110 and walls of boxes 124, as well as spacers 120. Air channel 140 between boxes 124 through which secondary air is drawn into the combustion plenum 118 is provided by spacers 120 and by bumps 134 at the lower corners of boxes 124. In addition, secondary burner air is drawn through spaces 136 around the outer edges of boxes 124. As a result, none of the burner ports formed between ribbons 108 and 110 are spaced from a source of secondary air by more than three intervening ports.

This invention discloses the discovery that by positioning the secondary air close to the ports the flame height may be made less than the total width of the burner section when sufficient fuel-air mixture is drawn through the ports to cause the flame to lift off the ports by a distance of, for example, a sixteenth of an inch to an eighth of an inch. Such flame lifting reduces the heating of the port ribbons 108 and 110 so that flashback ignition of the primary fuel-air mixture in the plenums 112 and 114 is prevented even when a relatively high primary air-fuel ratio is used. By thus reducing the length of the flame, the combustion plenum may be positioned across the lower rear corner of the oven immediately below the outlet regions 18 of the oven and the combustion products drawn from the burner will still be substantially deionized at the inputs to blowers 64.

In accordance with this invention a safety control circuit is provided in which an air flow sensor 148, comprising a vane actuated switch, is positioned in the vent 68. A manual selector control switch 168 energizes blower motors 72 when one of the convection cooking modes is selected. The output in vent 68 of blowers 64 closes air sensor switch 148 to energize a conventional resistance heater ignitor 132 extending into plenum 118. After a time delay period of, for example, thirty seconds, solenoid valve 98 is energized to allow gas to be supplied to jet 96. When the resultant fuel-air mixture reaches combustion plenum 118 through the ports in burner 92 it is ignited by the ignitor 132 and the products of combustion are drawn into the blower 64 and blown into the enclosure 12 through the inlet 16. The portion of the output of blowers 64 which is blown out vent 68 creates a slight negative pressure in combustion chamber 118 and in enclosure 12 which controls the amounts of primary air drawn in through the pipe 94 and secondary air drawn in around the edges of the burner sections 104 and 106. Since the tube 94 acts as an air restricting orifice for the primary fuel-air mixture, variations in blower speed and vapor temperature which vary the primary and secondary air drawn into the plenum also cause some variations in the flow of gaseous fuel through the regulator reducing the possibility of an over-rich fuel-air mixture being burned to cause noxious fumes to emanate from the screen 74 at the top of the stove.

The burner as shown herein can, for example, operate a thermal output of 20–30 thousand BTU's per hour. The thermal output is selected by selecting the sizes of the pipe 94, and jet 96 as well as the setting of the fuel pressure regulator 100. The secondary air is selected by selecting the size of the space 140 between boxes 124 and the spaces 136 at the edges of the burner sections 104 and 106 through which secondary air is drawn into the combustion plenum 118.

The gas burner 92 may be controlled by turning a control selector knob 168 to a section marked convection heating and by setting a temperature control knob 170 to a convection vapor temperature. A timer such as, for example, a digital clock 172, may also have on and off selector controls 174 and 176 for setting the time during which convection heat is supplied to the oven.

In operation, a temperature sensor bulb 178, mounted on a bracket in the enclosure 12 directly beneath inlet region 16, senses the temperature of the vapor circulated in the enclosure 12 and when the vapor is below the temperature set by control knob 170, the burner system 90 is energized.

In accordance with this invention the burner plenum 118 and the blower input plenum 20 are fabricated as a unit separable from the enclosure walls of cavity 12. As shown in greater detail in FIGS. 3–6, the plenums 20 and 118 consist of a flat wall member 180 containing holes corresponding to vapor inlet and outlet regions 16 and 18 which is attached to the back of oven cavity 12, for example, by sheet metal screws 182 with a vapor tight seal being produced by means of high temperature gaskets 184 extending around regions 16 and 18 and providing thermal insulation between the combustion plenum 118 and the rear wall of cavity 12. As a result, the interior temperature of combustion plenum 118, which may be 1,500°–2,000° F. is thermally isolated from the interior surface wall of the cavity which may be porcelainized and capable of withstanding temperatures of around 1,000° F. Sheet 180 extends downwardly below the bottom of cavity 12 and has a lip 186 bent at right angles thereto to form the edge of a plate spaced from box 124 of section 112 by secondary air passage 136. Brackets 116 are attached by screws 188 to lip 186. Also attached to sheet 180, for example, by welding is the shroud member 190 which is positioned directly in front of the centrifugal blowers with holes concentric with blower 64 and slightly smaller in diameter than blowers 64.

Blowers 64 are positioned in plenum 66 whose output is supplied to vent 68. The outer wall member 192 of plenum 66 is also welded around its edges to sheet 180 with the lower portion of member 192 defining, together with the lower portion of plate 180 the burner plenum 118. A recess in the lower wall portion of member 192 holds a block of refractory material 194 to prevent loss of heat outwardly from burner plenum 118. The edge of member 190 below block 194 is bent at right angles to form a lip 196 at the same level as lip 186 extending toward lip 186 to form a space 136 with the edge of box 124 of burner plenum 114. Support bracket 142 is also attached to lip 196 by a screw 188 so that the burner system 90 is rigidly attached to the lower end of burner plenum 118 and the spaces 136 between the lips 186 and 196 and boxes 124 are accurately controlled to provide a uniform slot for the passage of secondary air into the combustion plenum 118. Similar lips are positioned at the ends of the burner plenums or the end spacings may be eliminated entirely. Preferably, the spacings between the lips 186 and 196 and the boxes 124 are made approximately one-half the spacing between the boxes 124 so that each of the ribbon burner sections 104 and 106, fed by a separate plenum, is also supplied with a uniform amount of secondary air along each edge thereof. As an example, if the total port area in which ribbon burner is approximately 5 square inches by being about 14 inches long at about ⅜ of an inch wide with the port area being about half the burner surface area, then the spaces 136 may be about 3/16 of an inch wide and the space 140 may be about ⅜ of an inch wide.

To improve the uniformity of fuel feed to the sections 104 and 106, plenums 112 and 114 have sloping bottoms 198 in boxes 124 which are attached to the bottom of boxes 124 and pipe 94 and rise to points close to ribbons 108 and 110 at the close ends of boxes 124 which are farthest from pipe 94.

During normal baking operation, the burner blower system of this invention may operate with the primary air preferably being about 50 to 80% of that required for complete or stochiometric combustion of the fuel, and with sufficient secondary air to provide 100% excess air in the combustion plenum 118 and the average vapor temperature in the oven enclosure 12 is 300° F. to 500° F. When the burner first starts, 150% excess air may be drawn into plenum 118 since blowers 64 will move a greater mass of the cooler air whereas when the burner is operated continuously for self-cleaning and the vapor temperature at blowers 64 approaches 1,000° F., less air is drawn through into the plenum 118, for example, only 65% excess air, and the combustion products become hotter. However, sufficient excess air is present to avoid production of noxious fumes such as carbon monoxide.

This completes the description of the preferred embodiments of the invention described herein. However, numerous modifications thereof will be apparent to one having ordinary skill in the art without departing from the spirit and scope of the invention. For example, the vapor may be circulated through apertures located in regions other than the back wall, any desired electrical and mechanical control system for the burner may be used, and other locations of the blowers and the burners may be used. Accordingly, it is intended that this invention be not limited to the particular details of the embodiment illustrated herein except as defined by the appended claims.

What is claimed is:

1. A convection oven comprising:

a substantially rectangular oven cavity having a front access door;

a blower system positioned behind the rear wall of said cavity for circulating vapor through said cavity;

means for supplying heat to said vapor comprising a burner positioned behind said rear wall below the vapor input to said blower system;

said burner comprising ribbons of corrugated metal separated by flat metal ribbons defining primary fuel-air ports, each of said primary fuel-air ports being separated by fewer than four intervening fuel-air ports from a source of secondary air; and said blower system drawing a primary fuel-air mixture through said fuel-air ports and drawing secondary air from said source of secondary air.

2. The convection oven in accordance with claim 1 wherein:

said burner comprises two ribbon burner port sections separated by a secondary air port.

* * * * *